G. VAN WINKLE.
Combined Elevator and Scales.

No. 225,893. Patented Mar. 23, 1880.

Witnesses
Chas H Smith
Geo. T. Pinckney

Inventor
Garret Van Winkle
per Lemuel W. Serrell
atty

UNITED STATES PATENT OFFICE.

GARRET VAN WINKLE, OF PLAINFIELD, NEW JERSEY.

COMBINED ELEVATOR AND SCALE.

SPECIFICATION forming part of Letters Patent No. 225,893, dated March 23, 1880.

Application filed February 4, 1880.

*To all whom it may concern:*

Be it known that I, GARRET VAN WINKLE, of Plainfield, in the county of Union and State of New Jersey, have invented an Improvement in Elevator-Scales, of which the following is a specification.

Hoisting apparatus has been made with a weighing device combined in such a manner that the article that is hoisted up can be weighed either during the hoisting operation or while the article is suspended.

Elevator platforms and cars are extensively employed in raising goods in buildings, and it often becomes of great importance that the goods received or shipped should be weighed while they are upon the elevator.

In cases where an ordinary platform-scale has been placed upon the elevator the goods are liable to slip off the same, and the scale is unhandy and prevents the goods being delivered on or removed from the platform with facility.

My improvement is made for combining a platform-scale with the elevator-platform in such a manner that the scale will not be in the way, and goods can be placed upon or removed from the platform with as much facility as they could if there were not any scale, and the scale can be used to weigh the goods while being raised or lowered. I accomplish these objects by introducing the scale-platform into the elevator-platform, and only slightly above the same, and using the frame of the elevator-car as the standard and head-piece of the scale, thereby causing the frame of the elevator to perform two functions, and preventing the parts of the scale interfering with the elevator.

Figure 1:
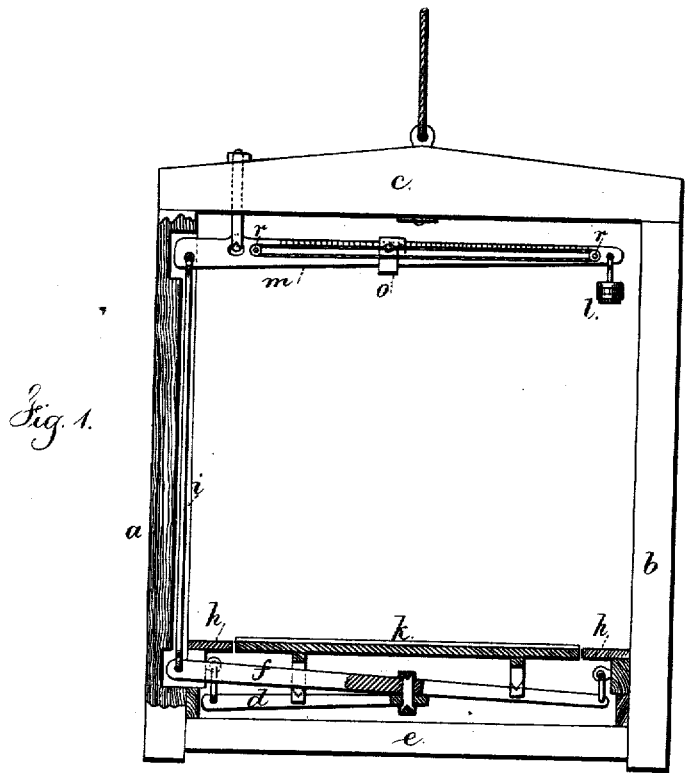
Figure 2:
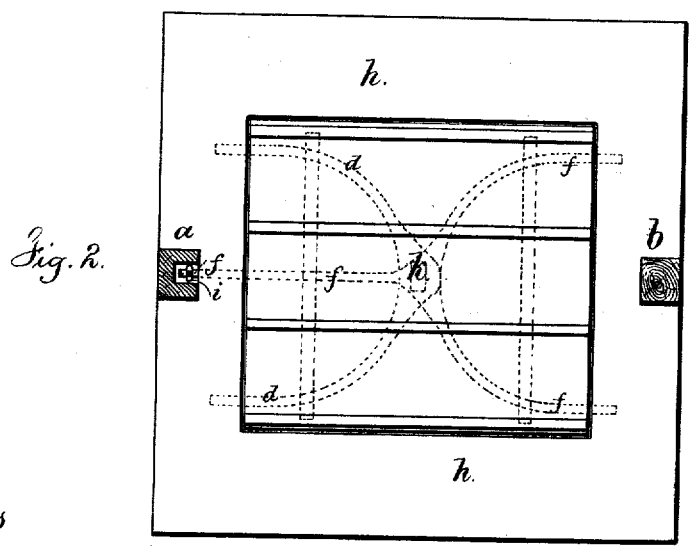

In the drawings, Figure 1 is an elevation of the scale and elevator-frame with the platform in section, and Fig. 2 is a plan with the head-beam of the elevator-frame removed.

The side pieces, $a$ $b$, head-beam $c$, and lower frame, $e$, of the elevator are similar to those before made use of, except the lower frame is sufficiently open to receive the levers $d$ and $f$, similar to the ordinary levers of a platform-scale, and the platform of the elevator is not solid, but it is open in the middle, so as to leave a sufficient space for the attendants to stand on the border $h$ of the platform, outside of the platform $k$, that is supported by the scale-levers, and this platform $k$ is slightly above the border $h$.

The upright $a$, forming one side of the elevator-frame, is either in two parts or provided with a groove, in which the vertical rod $i$ passes up from the lever $f$ to the scale-beam $m$, and this scale-beam is suspended from the head-beam $c$ of the elevator-frame, and said scale-beam $c$ is graduated in the proper manner, and it is adapted to receive the movable weights $l$ at its moving end, as now usual, and said moving end should be near the side piece, $b$, so that the weights $l$ will not be in the way of the goods that are upon the elevator-platform.

I make use of a sliding weight, $o$, upon the scale-beam, and in order to move the same conveniently from either side I place upon the scale-beam two small pulleys, $r$, around which a cord or chain passes, and is attached to said weight $o$. This allows for adjusting the weight with facility by moving the cord or chain, even if the goods reach up to near the scale-beam, and renders it unnecessary for the attendant to reach across in moving the weight.

This improvement is a great convenience in warehouses, as goods can be weighed without loss of time, and they can be weighed without any additional handling.

I claim as my invention—

1. The combination, with the frame and platform in an elevator, of a scale-platform within the main platform and a scale-beam connected to the cross-beam of the elevator-platform, as set forth, so that the separate standard and head-piece of the platform-scale are dispensed with.

2. In an elevator, a scale-beam connected with the head-beam of the platform-frame, and provided with pulleys and a cord or chain, by which the weight on the scale-beam can be moved from either side, as set forth.

Signed by me this 29th day of January, 1880.

GARRET VAN WINKLE.

Witnesses:
C. H. SCHERMERHORN,
E. H. HOLMES.